United States Patent [19]

Hoegberg et al.

[11] Patent Number: 5,068,591
[45] Date of Patent: Nov. 26, 1991

[54] SPEED CONTROL FOR ELECTRICAL GENERATING SYSTEM

[75] Inventors: Lon Hoegberg, Loves Park; Vijay Maddali, Rockford, both of Ill.

[73] Assignee: Sundstrand Corporation, Rockford, Ill.

[21] Appl. No.: 436,612

[22] Filed: Nov. 15, 1989

[51] Int. Cl.$^5$ .............................................. H02P 9/42
[52] U.S. Cl. ........................................ 322/29; 322/32; 322/40
[58] Field of Search ............................... 322/29, 32, 40

[56] References Cited

U.S. PATENT DOCUMENTS

| | | | |
|---|---|---|---|
| 3,663,945 | 5/1972 | Hughes et al. | 322/87 X |
| 4,246,531 | 1/1981 | Jordan | 322/32 X |
| 4,399,397 | 8/1983 | Kleinschmidt, Jr. | 322/29 X |
| 4,413,223 | 11/1983 | Yundt et al. | 322/32 |
| 4,695,736 | 9/1987 | Doman et al. | 322/28 X |

Primary Examiner—R. J. Hickey
Attorney, Agent, or Firm—Wood, Phillips, Mason, Recktenwald & VanSanten

[57] ABSTRACT

An electrical generating system is driven by a variable speed prime mover through a constant speed drive. A speed control, as a proportional integrator responsive to frequency error, controls the constant speed drive. Stability and speed of response of the system are improved by the inclusion of one or more of the following in the speed control: a lead/lag filter between the output of proportional integrator and the constant speed drive; an adaptive gain circuit for the frequency error signal ahead of the proportional integrator; an adaptive integrator for delaying integrator operation on occurrence of a load current change; a nonlinear gain circuit in parallel with the proportional integrator to increase the control signal as the error signal increases; or load current or input speed bias signals added to the control signal to reduce the range of integrator output.

19 Claims, 2 Drawing Sheets

SPEED CONTROL FOR ELECTRICAL GENERATING SYSTEM

FIELD OF THE INVENTION

This invention relates to a speed control for an electrical generator driven from a variable speed source through a constant speed drive.

BACKGROUND OF THE INVENTION

In a typical aircraft electrical generating system, the aircraft engine, which operates over a range of speeds, drives a generator through a constant speed drive (CSD). The frequency of the generator is compared with a reference frequency to establish a control signal for the CSD, maintaining a constant steady state frequency. A typical speed control has a proportional integrator circuit which combines the error signal with an integral of the error signal to provide the CSD control signal. The generating system is subject to transient frequency deviation with changes of load and input speed.

BRIEF SUMMARY OF THE INVENTION

It is a principal feature of the invention to improve the stability and response time of the generating system with load and input speed changes.

One feature of the invention is the addition of a lead-/lag filter connected between the output of the proportional integrator and the control input of the CSD.

Another feature is the provision of a circuit responsive to a load current change for temporarily inhibiting operation of the integrator.

A further feature is the incorporation of a variable gain amplifier for the error signal with a gain which varies as a function of input speed, to complement the CSD gain characteristic.

And another feature is the addition of a nonlinear gain stage in parallel with the proportional integrator.

And another feature is the addition of a bias for the CSD control signal based on one or both of the load current and the CSD input speed.

Further features and advantages of the invention will readily be apparent from the following specification and from the drawings, in which.

Figure 1:
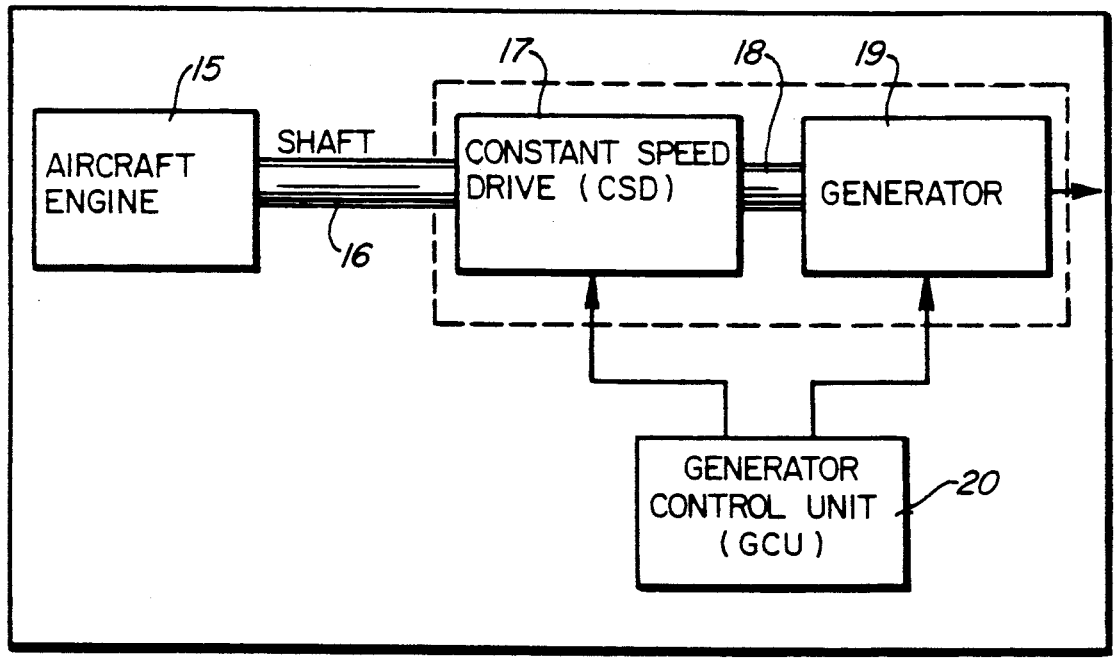
FIG. 1 is a block diagram of an electrical generating system in which the speed control may be used.

A typical aircraft electric power generating system, FIG. 1, is driven by an aircraft engine 15 which will operate over a range of speeds. The output shaft 16 of the aircraft engine drives a mechanical input of a constant speed drive (CSD) 17 which has an output shaft 18 that drives a generator 19. The generator control unit (GCU) 20 monitors system conditions, including the speed of shaft 16 and the speed, frequency, voltage and current of generator 19. GCU 20 provides a control signal output to a control input of CSD 17 which keeps the speed of shaft 18 and thus the frequency of generator 19 within prescribed limits. Another output of GCU 20 controls generator field current to maintain the generator output voltage within limits.

Figure 2:
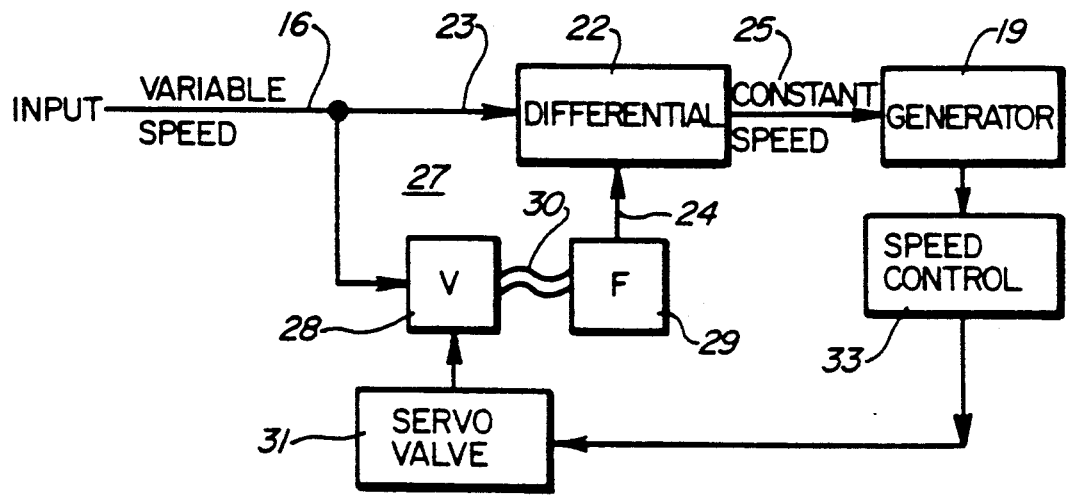
FIG. 2 is a block diagram of a constant speed drive, generator and speed control.

The CSD is illustrated in more detail in FIG. 2. A differential 22 has two inputs 23, 24 and an output 25 which is connected with the shaft of generator 19. A speed changing hydraulic link 27 has a variable displacement hydraulic pump 28 and a fixed displacement hydraulic motor 29. In a typical system, pump 28 is a multiple piston pump with an adjustable wobbler plate which controls piston displacement. Motor 29 is a similar machine with fixed displacement pistons. Hydraulic fluid from pump 28 is coupled to motor 29 as indicated at 30. An electrically actuated servo valve 31 controls the position of the wobbler plate of pump 28 and thus the speed of motor 29.

Variable speed shaft 16 of the aircraft engine drives the input 23 of differential 22 and the hydraulic pump 28. Motor 29 is connected with the second input 24 of differential 22 and the differential output 25 represents the sum of the differential inputs. Speed control 33, a portion of the GCU, controls servo valve 31, as will appear, to maintain the generator speed and frequency constant. The electrical generating system accommodates changes of engine speed and of load on the electrical generator, minimizing both the amplitude and time duration of transient frequency deviations from the normal frequency, 400 Hz.

Figure 3:
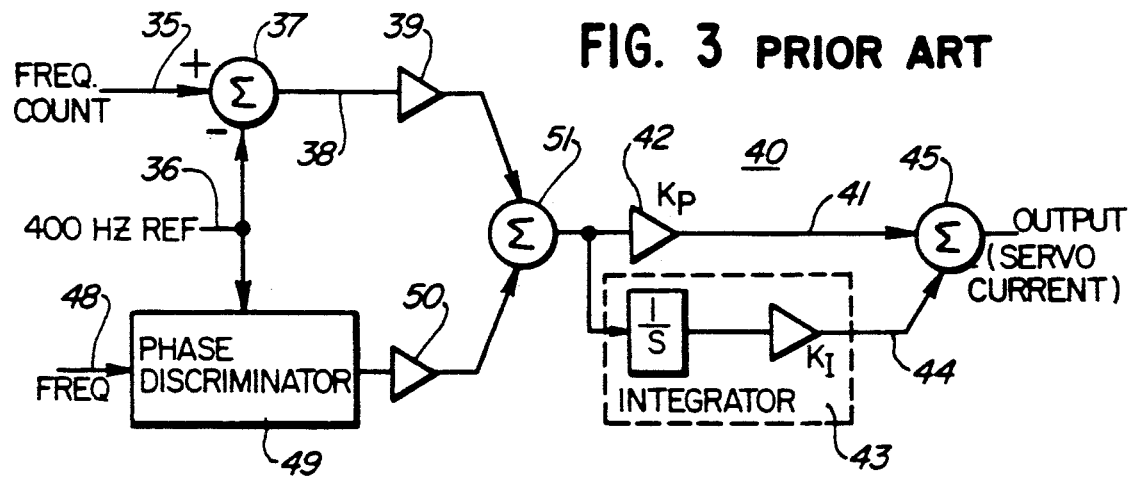
FIG. 3 is a functional block diagram of a prior art speed control.

The functional diagram of FIG. 3 illustrates a prior art control. A signal representing a generator frequency at 35 is compared with a reference signal 36, 400 Hz, in summing junction 37. A frequency error signal at 38 is amplified at 39. The frequency error signal is connected with a proportional integrator circuit 40 which has a first leg 41 in which the error signal is amplified at 42. The error signal is connected also with an integrator circuit 43 in parallel with leg 44. The amplified and integrated error signals are summed at junction 45 providing a control output signal for the servo valve 31 of hydraulic link 27.

In a system having two or more generators which are operated in parallel, it is necessary also that the phase of the generators be controlled so that they may be interconnected in parallel when at substantially the same phase. In this situation a generator frequency signal at 48 and the reference signal 36 are connected with a phase discriminator 49 providing a phase error signal that is amplified by amplifier 50 and summed with the frequency error signal at junction 51. The control circuit of FIG. 3 may be implemented in analog or digital form. In digital form, the circuit may be hard wired or the functions indicated may be performed by a programmed processor.

The transient performance of the circuit of FIG. 3 when load is removed from the generator, particularly at high engine speed, is too slow. This is due to a cavitation phenomenon in the hydraulic link 27. The controller tends to make cavitation worse by moving the pump wobbler plate in a direction that forces the hydraulic link deeper into cavitation. In a cavitation condition, the electrical system is essentially running in an open loop configuration. Limiting the excursion of integrator 43 will minimize cavitation. However, to accommodate all system operating conditions, the integrator limits must be far apart and the limit has little effect during a load removal transient.

Figure 4:
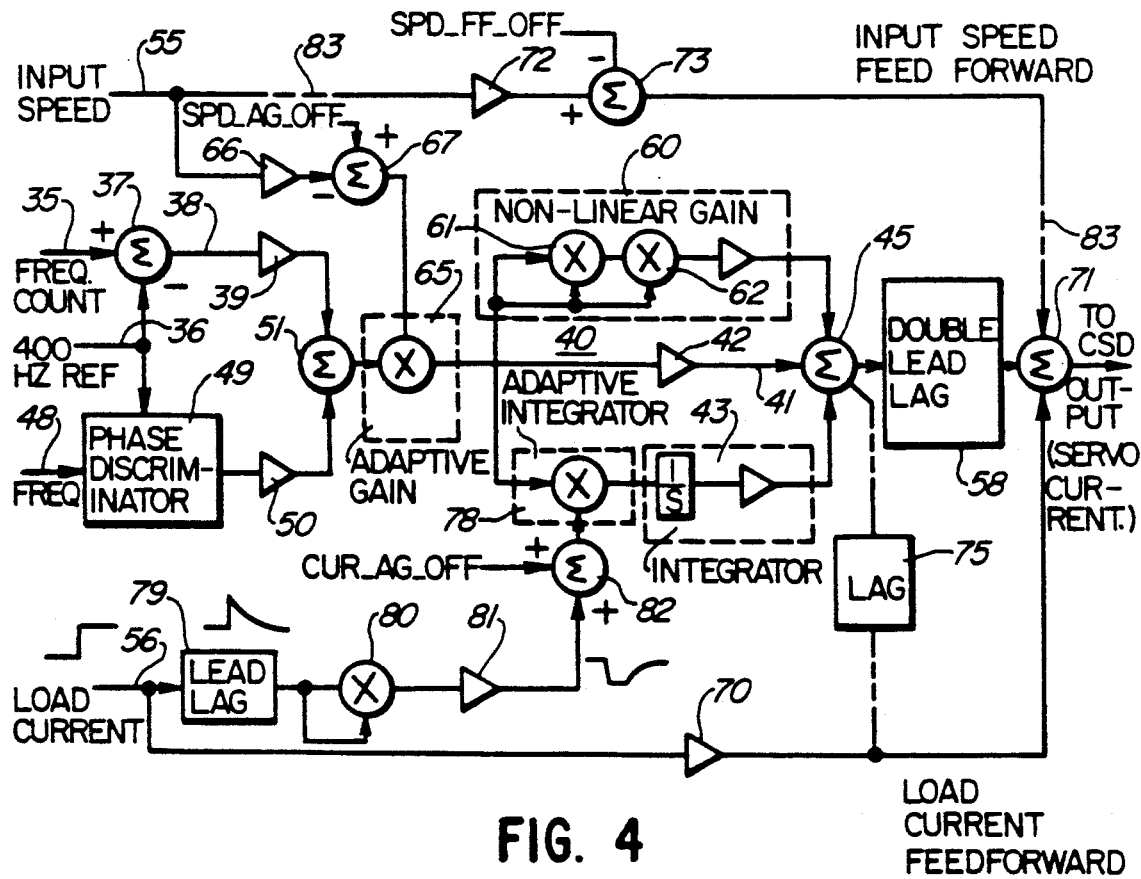
FIG. 4 is a functional block diagram of a speed control with the enhancements which are the subject of this invention.

The control circuit functional block diagram of FIG. 4 illustrates several additions to or enhancements of the control circuit of FIG. 3 which improve both transient response and system stability. The circuit of FIG. 4 has additional input signals indicating the CSD input speed 55 and generator load current 56.

A double lead/lag network 58 added to the control circuit between summing junction 45 and the CSD improves the initial transient response. It also reduces overshoot in the constant speed drive, thereby reducing the total time required for the system to settle and return to steady state operation.

A nonlinear gain amplifier stage 60 provides additional amplification of the frequency error signal. The output of amplifier 60 is summed with the proportional integral signal at junction 45. The nonlinear gain stage has two series connected multipliers 61, 62 providing a cube function of the error signal to maintain the error signal sign. As the error signal increases, the output of the nonlinear gain stage 60 increases geometrically, contributing to a more rapid system response.

The performance of the system varies significantly between low and high engine speed, or input speed, to the CSD. At low input speed the system gain is lower than at high input speed. An adaptive or variable gain stage 65 acts on the error signal output of summing junction 51, ahead of the proportional integrator 40. The CSD input speed signal 55 is connected through an amplifier 66 with a negative input to summing junction 67. A positive bias signal SPD AG OFF is also connected with summing junction 67. At low speeds the adaptive gain of stage 65 is high. As the engine speed increases, the gain is reduced. This compensates for the higher gain of the CSD at high input speed. The adaptive gain stage 65 makes the system transient response with load change less sensitive to engine speed.

The steady state output of the proportional integrator of FIG. 3 is significantly different with different load and input speed conditions. This results from differences in the mechanical moment of the wobbler of the CSD which varies with load and speed. The integrator signal variation is reduced by adding load current and input speed bias or feed forward signals to the proportional integrator output. The load current signal 56 is coupled through amplifier 70 with a summing junction 71 where it is added to the control signal from lead/lag network 58. Input speed signal 55 is coupled through amplifier 72 to summing junction 73 where it is reduced by a bias signal SPD FF OFF. The input speed feed forward effect occurs only at higher input speeds. The output of summing junction 73 is summed with the control signal at summing junction 71.

The compensation provided by adaptive gain of the error signal from summing junction 51 and the amplified feed forward speed and load current signals could be implemented in other ways. For example, cube amplifiers as in the nonlinear gain amplifier 60, might be used depending on the requirements of the specific CSD.

The load current feed forward signal may be combined with the proportional integral signal at junction 45 rather than junction 71. However, if this change is made, a lag filter 75 is required to reduce noise in the load current signal.

The gain of the load current feed forward bias circuit is determined by first measuring the change in the integrator output for a load application at different input speeds. By averaging the changes in the integrator output and measuring the load current signal, the gain necessary to minimize the change in integrator output is determined. A similar calculation determines the gain of the input speed feed forward bias circuit.

As the variation in steady state integrator output is reduced, the integrator limits can be tightened, decreasing the tendency of the CSD to cavitate. However, as the CSD wobbler moments have a nonlinear behavior with speed, the load removal transient at a high input speed still results in hydraulic cavitation.

An adaptive integrator, block 78, inhibits operation of the integrator during the initial portion of a load transient and minimizes cavitation of the hydraulic unit which may be induced by the speed control. The load current signal 56 is differentiated at lead/lag block 79. The differentiated signal is squared at block 80 which has a positive going output for both load on and load off transients. The positive signal is inverted by amplifier 81 providing a negative control signal for adaptive integrator 78. In the absence of a load current change, adaptive integrator 78 passes the speed error signal from summing junction 51 and adaptive gain block 65 to the integrator 43 as a result of a positive bias signal connected with summing junction 82. On the occurrence of a load current transient the negative signal from amplifier 81 is summed with the positive bias reducing the gain control signal to the integrator. The effect of the adaptive integrator circuit is such that the input speed feed forward circuit can be eliminated, as indicated by the broken line connections 83.

The preferred form of the control is that illustrated in solid lines in FIG. 4 with each of the following enhancements: lead/lag 58; nonlinear gain 60; adaptive gain 65; load current feed forward through amplifier 70 to summing junction 71; and adaptive integer 78.

As pointed out above, the control circuit may be implemented in an analog or digital form. In digital form, the circuit may be hard wired, performed by a programmed microprocessor or embodied in a custom chip.

We claim:

1. In an electrical generating system having
   a variable speed prime mover,
   a constant speed drive (CSD) with
      a variable speed input connected to the prime mover,
      a control input and
      a constant speed output,
   an AC generator connected with the CSD constant speed output and
   a speed control including
      a source of reference frequency,
      means comparing the generator output frequency with the reference frequency to establish an error signal, and
      means responsive to the error signal performing a proportional integration function to establish a CSD control signal,
   the improvement comprising:
   a lead/lag filter connected between the output of the proportional integration means and the CSD control input.

2. The improved speed control of claim 1 in which said lead/lag filter performs a double lead/lag operation on said control signal.

3. In an electrical generating system having
   a variable speed prime mover,
   a constant speed drive (CSD) with
      a variable speed input connected to the prime mover, a control input and
a constant speed out,
an AC generator connected with CSD constant speed output and
a speed control including
a source of reference frequency,
means comparing the generator output frequency with the reference frequency to establish an error signal, and
means responsive to the error signal performing a proportional integration function to establish a CSD control signal,
the improvement comprising:
a gain circuit between the frequency comparing means and the proportional integration means for varying the error signal to the proportional integration means.

4. The speed control of claim 3 in which the gain of said gain circuit reduces sensitivity of system response to prime mover speed.

5. The speed control of claim 4 in which said gain circuit is an adaptive gain circuit.

6. The speed control of claim 3 in which said gain circuit stabilizes the system at different prime mover speeds.

7. The speed control of claim 5 in which said CSD and generator have a gain which is directly proportional to the CSD input speed, and including a source of signal representing said CSD input speed and in which the gain of said adaptive gain circuit is inversely proportional to said input speed signal.

8. In an electrical generating system having
a variable speed prime mover,
a constant speed drive (CSD) with
a variable speed input connected to the prime mover,
a control input and
a constant speed output,
an AC generator connected with the CSD constant speed output and
a speed control including
a source of reference frequency,
means comparing the generator output frequency with the reference frequency to establish an error signal, and
means responsive to the error signal performing a proportional integration function to establish a CSD control signal, including a gain stage in parallel with an integrator stage,
the improvement comprising: a source of signal representing generator load current; and
means responsive to said load current signal for modifying the operation of said integrator.

9. The speed control of claim 8 in which operation of the integrator is delayed on occurrence of a change in load current.

10. The speed control of claim 9 including means for differentiating said load current signal, operation of said integrator being delayed in accordance with the derivative of the load current signal.

11. The speed control in claim 10 including means for squaring the load current derivative signal to maintain a positive sign with a decrease of load current.

12. In an electrical generating system having
a variable speed prime mover,
a constant speed drive (CSD) with
a variable speed input connected to the prime mover,
a control input and
a constant speed output,
an AC generator connected with the CSD constant speed output and
a speed control including
a source of reference frequency,
means comparing the generator output frequency with the reference frequency to establish an error signal, and
means responsive to the error signal performing a proportional integration function to establish a CSD control signal,
the improvement comprising:
a nonlinear gain circuit connected in parallel with said proportional integration means to increase the control signal as the error signal increases.

13. The speed control of claim 12 in which said the output of the nonlinear gain circuit is a geometric function of the error signal.

14. The speed control of claim 13 in which said nonlinear gain circuit has a cube function to maintain the sign of the error signal.

15. In an electrical generating system having
a variable speed prime mover,
a constant speed drive (CSD) with
a variable speed input connected to the prime mover,
a control input and
a constant speed output, an AC generator connected with the CSD constant speed output and
a speed control including
a source of reference frequency,
means comparing the generator output frequency with the reference frequency to establish an error signal, and
means responsive to the error signal performing a proportional integration function to establish a CSD control signal,
the improvement comprising:
a source of load current signal; and
means responsive to said load current signal for summing a load current bias with the control signal from the proportional integrator.

16. The speed control of claim 1 including:
a source of load current signal; and
means responsive to said load current signal for summing a load current bias with the control signal at the output of the lead/lag filter.

17. The speed control of claim 1 including:
a source of load current signal;
a lag circuit for said load current signal; and
means connected with the output of said lag circuit for summing a load current bias with the control signal at the input of said lead/lag filter.

18. In an electrical generating system having a variable speed prime mover,
a constant speed drive (CSD) with
a variable speed input connected to the prime mover,
a control input and
a constant speed output,
an AC generator connected with the CSD constant speed output and
a speed control including
a source of reference frequency,
means comparing the generator output frequency with the reference frequency to establish an error signal, and means responsive to the error signal performing a proportional integration function to establish a CSD control signal, the improvement comprising:

a source of input speed signal proportional to the input speed of the CSD; and means responsive to said input speed signal for summing an input speed signal bias with the control signal from the proportional integrator.

19. The speed control of claim 1 including:

a source of input speed signal proportional to the input speed of the CSD; and means responsive to said input speed signal for summing an input speed bias with the control signal at the output of the lead/lag filter.

* * * * *